(12) United States Patent
Beaumont-Smith et al.

(10) Patent No.: US 8,555,040 B2
(45) Date of Patent: Oct. 8, 2013

(54) INDIRECT BRANCH TARGET PREDICTOR THAT PREVENTS SPECULATION IF MISPREDICT IS EXPECTED

(75) Inventors: Andrew J. Beaumont-Smith, Cambridge, MA (US); Ramesh Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 677 days.

(21) Appl. No.: 12/785,939

(22) Filed: May 24, 2010

(65) Prior Publication Data

US 2011/0289300 A1    Nov. 24, 2011

(51) Int. Cl.
   *G06F 9/32*    (2006.01)
(52) U.S. Cl.
   USPC ........................................ 712/238
(58) Field of Classification Search
   USPC ........................................ 712/238
   See application file for complete search history.

(56) References Cited

U.S. PATENT DOCUMENTS

| | | | |
|---|---|---|---|
| 5,313,634 A | 5/1994 | Eickemeyer | |
| 5,608,886 A | 3/1997 | Blomgren et al. | |
| 5,835,754 A | 11/1998 | Nakanishi | |
| 5,968,169 A | 10/1999 | Pickett | |
| 6,014,734 A | 1/2000 | Tran et al. | |
| 6,271,877 B1 | 8/2001 | LeCompte | |
| 6,308,322 B1 * | 10/2001 | Serocki et al. | 717/145 |
| 6,601,161 B2 * | 7/2003 | Rappoport et al. | 712/238 |
| 7,117,347 B2 * | 10/2006 | Col et al. | 712/239 |
| 7,165,169 B2 | 1/2007 | Henry et al. | |
| 7,200,740 B2 | 4/2007 | Henry et al. | |
| 7,237,098 B2 | 6/2007 | Henry et al. | |
| 7,434,037 B2 | 10/2008 | Park et al. | |
| 2008/0307210 A1 | 12/2008 | Levitan et al. | |
| 2009/0089564 A1 | 4/2009 | Brickell et al. | |
| 2009/0172371 A1 | 7/2009 | Joao et al. | |
| 2009/0177858 A1 | 7/2009 | Gschwind et al. | |
| 2009/0198981 A1 | 8/2009 | Levitan et al. | |

OTHER PUBLICATIONS

Pattern, David. Hennessy, John. "Computer Architecture: A Quantitative Approach". Morgan Kaufmann Publishers, Inc. 1996, pp. 271-278.*
Kozyrakis, Christos. "EE382A Lecture 5: Branch Prediction". 2009, 10 pages.*

* cited by examiner

*Primary Examiner* — Robert Fennema
(74) *Attorney, Agent, or Firm* — Lawrence J. Merkel; Meyertons, Hood, Kivlin, Kowert & Goetzel, P.C.

(57) ABSTRACT

In one embodiment, a processor implements an indirect branch target predictor to predict target addresses of indirect branch instructions. The indirect branch target predictor may store target addresses generated during previous executions of indirect branches, and may use the stored target addresses as predictions for current indirect branches. The indirect branch target predictor may also store a validation tag corresponding to each stored target address. The validation tag may be compared to similar data corresponding to the current indirect branch being predicted. If the validation tag does not match, the indirect branch is presumed to be mispredicted (since the branch target address actually belongs to a different instruction). The indirect branch target predictor may inhibit speculative execution subsequent to the mispredicted indirect branch until the redirect is signalled for the mispredicted indirect branch.

22 Claims, 4 Drawing Sheets

INDIRECT BRANCH TARGET PREDICTOR THAT PREVENTS SPECULATION IF MISPREDICT IS EXPECTED

BACKGROUND

1. Field of the Invention

This invention is related to the field of branch prediction in processors, and more particularly to indirect branch prediction.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

In an integrated circuit that includes one or more processors, power management is balanced with the need for high processor performance. To improve performance, the processor often implements deep pipelines for instruction execution, and often implements out-of-order speculative execution as well. With typical software including complicated control flows with numerous branch instructions, branch prediction is typically employed to speculate past the branch instructions in the speculative instruction stream to uncover additional instructions for potential out-of-order execution.

While branch prediction can increase performance, branch mispredictions incur costs in both performance and power. Generally, the instructions that are subsequent to the branch in the speculative program order (sometimes referred to as younger instructions) must be flushed, any speculative state corresponding to the subsequent instructions must be discarded, and any speculative state corresponding to the most recent instructions that were not flushed must be restored or recreated. The power expended to recover from the misprediction, along with the power expended to incorrectly execute the flushed instructions, represents wasted power.

SUMMARY

In one embodiment, a processor implements an indirect branch target predictor to predict target addresses of indirect branch instructions. The indirect branch target predictor may store target addresses generated during previous executions of indirect branches, and may use the stored target addresses as predictions for current indirect branches. The indirect branch target predictor may also store a validation tag corresponding to each stored target address. The validation tag may be compared to similar data corresponding to the current indirect branch being predicted. If the validation tag does not match, the indirect branch is presumed to be unpredictable or mispredicted (since the branch target address belongs to a different instruction (e.g. an indirect branch instruction at a different point in the speculative instruction stream). The indirect branch target predictor may inhibit speculative execution subsequent to the mispredicted indirect branch, until redirect is signalled when the indirect branch is executed. The speculative execution may be inhibited by preventing the fetch of the instructions at the target address; by fetching the instructions but stalling them before decode; by permitting the decode but preventing the instructions from being processed by speculative hardware; etc. The instructions at the sequential address to the mispredicted indirect branch are also not processed until after the redirect.

Accordingly, in some embodiments, the power that would be expended to flush the subsequent instructions and to recover speculative state may be conserved. Furthermore, the power that would be expended to execute the instructions that are on the incorrect speculative path may also be conserved, or may be expended executing other instructions instead of the instructions that are subsequently flushed.

The validation state may include a portion of the program counter address (PC) that locates the indirect branch instruction in memory (i.e. the address used to fetch the indirect branch instruction itself). The portion of the PC may be logically combined with other information related to the instruction, in other embodiments. For example, the other information may include the register addresses of the register operands used to form the target address, other portions of the instruction such as the opcode or other instruction fields, various processor mode control bits, and/or any other desired state that may be likely to identify a particular indirect branch instruction. The other information may be used alone, or several items of the other information may be used in combination to form the validation tag.

BRIEF DESCRIPTION OF THE DRAWINGS

The following detailed description makes reference to the accompanying drawings, which are now briefly described.

Figure 1:
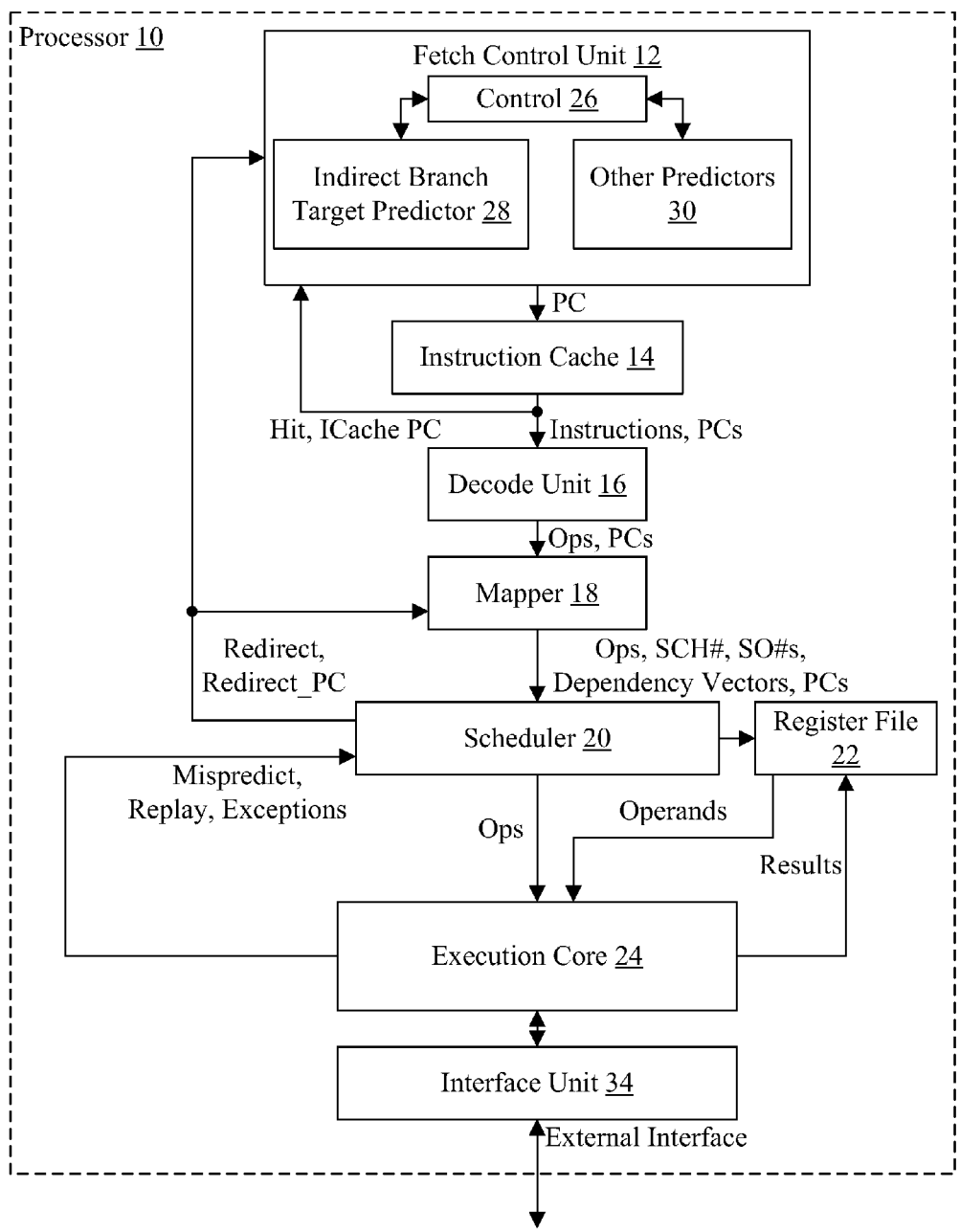
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/ components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The instruction cache 14 is further configured to provide a hit indication and an ICache PC to the fetch control unit 12. The mapper 18 is coupled to provide ops, a scheduler number (SCH#), source operand numbers (SO#s), one or more dependency vectors, and PCs to the scheduler 20. The scheduler 20 is coupled to receive replay, mispredict, and exception indications from the execution core 24, is coupled to provide a redirect indication and redirect PC to the fetch control unit 12 and the mapper 18, is coupled to the register file 22, and is coupled to provide ops for execution to the execution core 24. The register file is coupled to provide operands to the execution core 24, and is coupled to receive results to be written to the register file 22 from the execution core 24. The execution core 24 is coupled to the interface unit 34, which is further coupled to an external interface of the processor 10.

In the illustrated embodiment, the fetch control unit 12 includes a control circuit 26, an indirect branch target predictor 28, and one or more other predictors 30. The control circuit 26 is coupled to the indirect branch target predictor 28 and the other predictors 30. The control circuit 26 may be configured to generate the fetch PCs for the instruction cache 14. The fetch PCs may be generated at least in part based on the indirect branch target predictor 28 and the other predictors 30. More particularly, the indirect branch target predictor 28 may predict the target address for indirect branch instructions. The control circuit 26 may select the target address from the indirect branch target predictor as the next fetch address when the indirect branch target predictor 28 makes a prediction. In one embodiment, the other predictors 30 are also used for indirect branch instructions, to predict the instructions taken or not taken. In an embodiment, the indirect branch target predictor 28 may only be accessed if the indirect branch instruction is predicted taken via the other predictors 30. Predicted not-taken branches use the next sequential PC, which may be generated from the current fetch PC and thus need not be stored in the indirect branch target predictor 28.

The other predictors 30 may include any type of branch predictors. The other predictors 30 may include other target address predictors for other types of branches as well as taken/not taken predictors of various types that predict conditional branches (whether indirect or not), etc. Thus, the next fetch PC generated by the fetch control unit 12 may be determined from the other predictors 30 for branch instructions that are not indirect branches.

In the illustrated embodiment, the control circuit 26 may access the branch predictors after verifying that a given PC is a cache hit. Accordingly, in the illustrated embodiment, the fetch control unit 12 receives a hit indication from the instruction cache 14 along with the ICache PC (that is, the PC for which the hit is detected). In other embodiments, the control circuit 26 may retain fetch PCs that have been issued to the instruction cache 14 locally in the fetch control unit 12, and the instruction cache 14 need only return a hit indication for the fetch. The hit indication may, e.g. be a signal that is asserted to indicate hit and deasserted to indicate miss, or vice versa.

Accordingly, in the illustrated embodiment, branch prediction may be performed in parallel with decode of the instructions in the decode unit 16. The branch predictors may use the fetch PCs (or portions thereof) to look up prediction data in the respective branch prediction memories implemented by the predictors. The decode unit 16 may feedback signals indicating the detection of branch instructions of various types (not shown in FIG. 1) to control which predictors are used, or the predictors may be accurate enough to frequently predict the correct PC without such feedback. Other embodiments may perform the prediction at any point in the processing of the corresponding instructions (e.g. in parallel with the instruction cache read, after decode, etc.).

As mentioned previously, the indirect branch target predictor 28 may store validation tags for the target addresses stored by the predictor and used to predict indirect branch targets. The validation tags may include a portion of the PC of the indirect branch instruction (or the PC of the group of instructions that include the indirect branch instruction). The PC bits included in the validation tags may generally not include the bits that are used to index a branch prediction memory in the indirect branch target predictor 28 to read a stored target address and validation tag. For example, about 8 bits of the PC may be used in some embodiments. Alternatively or in addition, the validation tags may include other data related to the instruction. Various instruction attributes may be included in the validation tags. For example, a portion of the instruction may be an instruction attribute that is part of the validation tag (e.g. the register addresses used to form the branch target address, the opcode or other fields of the instruction, etc.). The decode unit 16 may supply the portion of the instruction for validation in such embodiments. Other instruction attributes may include processor state or mode information, instruction mode data, branch history (local or global), etc. Thus, embodiments may include validation tags that include PC bits, and other tags that exclude PC bits. Embodiments may include validation tags that include attributes of the instruction, or that exclude such attributes. The data (PC bits, instruction attributes, etc.) may be logically combined (e.g. exclusive ORed) to produce a validation tag, reducing the size of the tag, or may be concatenated together to form the validation tag. Generally, the validation tag may comprise any data that corresponds to a particular indirect branch instruction. The data may not be unique to the particular indirect branch instruction, but a mismatch with the validation tag does indicate that the target address from the indirect branch predictor 28 is not associated with the particular indirect branch instruction being predicted. That is, the target address from the indirect branch predictor 28 is associated with a different indirect branch instruction than the particular indirect branch instruction being predicted if there is a mismatch with the validation tag. The different indirect branch instruction may use the same entry in the branch prediction memory, but the validation tag permits the identification of the entry as storing the target address for the different indirect branch instruction when the particular indirect branch instruction is being predicted. The different indirect branch instruction may be located at a different point in the speculative instruction stream, for example, even if the different indirect branch instruction and the particular indirect branch instructions are instances of the same instruction defined in the instruction set architecture implemented by the processor 10.

In some embodiments, the data for validation may become available subsequent to the predictors making the prediction (e.g. the validation may be pipelined). For example, the decode unit 16 may not be able to supply the instruction data until late in the clock cycle that the prediction is made, and the validation may be pipelined to the next clock cycle. In such cases, the fetch control unit 12 may be configured to supply the target address from the indirect branch target predictor 28 as the next fetch PC, and may cancel the instruction fetch at a later point if the validation tag does not match the instruction data. Furthermore, as previously mentioned, inhibiting speculative processing of the target instructions may be performed after fetch of the target instructions in some embodiments. Cancellation of the fetch may not be needed in such cases.

If the validation tag and the corresponding instruction data do not match, the indirect branch target predictor may inhibit the speculative processing of instructions after the indirect branch instruction until the branch instruction executes and the redirect occurs to the correct address. For example, the fetch control unit 12 may stall instruction fetching; or may permit instruction fetch at the target address from the indirect branch target predictor 28 but may stall the instructions above the decode unit; or may permit fetching and decode of the target instruction but stall the instructions at the input to the mapper 18. In an embodiment, the target instructions may be stalled at a point prior to the update of speculative state. In such an embodiment, there may be no need to recover speculative state in the event that the indirect branch instruction is mispredicted (e.g. the target address is different from the predicted target address). Furthermore, the sequential instructions to the indirect branch instruction may also not be processed until the redirect occurs.

Because instructions are fetched in the processor 10 based on various predictions, the instruction stream provided to the downstream circuitry (e.g. decode unit 16, mapper 18, scheduler 20) is a speculative instruction stream. That is, the instructions in the speculative instruction stream may or may not actually be executed according to the in-order, non-speculative program flow. Accordingly, instructions that are fetched at the target address predictor for an indirect branch (and subsequently fetched instructions) may be viewed as instructions that are subsequent to the indirect branch in the speculative instruction stream. Viewed in another way, these instructions are younger than the indirect branch in the speculative instruction stream.

Generally, a branch instruction may be any instruction that causes instruction execution to proceed at a target address (conditionally, in some cases) rather than with the next sequential instruction after the branch instruction in memory. Branch instructions are sometimes also referred to as control flow instructions, and are also sometimes more briefly referred to as simply a branch. Some branch instructions are conditional, in which execution proceeds either at the target address or at the sequential address dependent on a condition. The condition may be specified in a predefined condition code register, may be specified as an operand of the branch instruction, may be determined via comparison of an operand to a constant such as zero, or may be determined via comparison of operands. Other branches may be unconditional, in which the target address is always used. The target address may be generated in a variety of fashions. Direct branches may specify the absolute address as an immediate operand of the branch, or may be relative branches that specify the target address as a displacement from the PC of the branch, where the displacement is a field of the branch instruction. Indirect branch instructions may specify one or more operands from which the target address is calculated. In the case that only one operand is used, the target address may be calculated as the contents of that operand. In the case that multiple operands are provided, the target address may be calculated by adding the operands (i.e. the target address may be the sum of the operands). The operands may include register operands, specified via register addresses included in the instruction. In some cases, the operands may include memory operands read from an address specified by the instruction.

Because the indirect branches use operands to calculate the target address and these operands may not be available during fetch and decode of the indirect branch instruction, the target address often cannot be formed directly during fetch and decode. Thus, the indirect branch target predictor 28 is provided to predict the target address.

The fetch control unit 12 may also be redirected (e.g. via branch misprediction, exception, interrupt, flush, etc.) using the redirect_PC and the redirect signalling. In the illustrated embodiment, the redirection may be provided by the scheduler 20. In other embodiments, redirection may be provided by the execution core 24, or some redirects may be provided from the execution core 24 while others are provided from the scheduler 20. The redirection signalling may specify the reason for redirection (e.g. branch misprediction, exception, etc.). For branch mispredictions, the redirection signalling may specify the type of misprediction. For example, types may includes mispredicted indirect branch target, mispredicted indirect branch direction, mispredicted direct branch target, and mispredicted direct branch direction. The control circuit 26 may use the redirection signalling to determine which predictors 28 or 30 to update, if any, in addition to fetching from the redirect PC.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the performance of the operations defined for that instruction according to the instruction set architecture implemented by the processor 10. In some embodiments, each instruction may decode into a single instruction operation. The decode unit 16 may be configured to identify the type of instruction, source operands, etc., and the decoded instruction operation may comprise the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle.

In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In one embodiment, the SCH# may also be configured to identify the rename register assigned to the destination of the op. In other embodiments, the mapper 18 may be configured to assign a separate destination register number. Additionally, the mapper 18 may be configured to generate dependency vectors for the op. The dependency vectors may identify the ops on which a given op is dependent. In one embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 18 may provide the ops, along with SCH#, SO#s, PCs, and dependency vectors for each op to the scheduler 20. The scheduler 20 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 20 may be configured to schedule the ops for execution in the execution core 24. When an op is scheduled, the scheduler 20 may be configured to read its source operands from the register file 22 and the source operands may be provided to the execution core 24. The execution core 24 may be configured to return the results of ops that update registers to the register file 22. In some cases, the execution core 24 may forward a result that is to be written to the register file 22 in place of the value read from the register file 22 (e.g. in the case of back to back scheduling of dependent ops).

The execution core 24 may also be configured to detect various events during execution of ops that may be reported to the scheduler. Branch ops may be mispredicted, some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 24 may be configured to execute indirect branch ops, and may receive the predicted target address provided by the indirect branch target predictor 28 (pipelined through the mapper 18 and the scheduler 20). The execution core 24 may be configured to calculate the target address from the operands of the indirect branch op, and to compare the calculated target address to the predicted target address to detect correct prediction or misprediction. Additionally, if no prediction was made for the indirect target address, the indirect branch op may be tagged as such. The execution core 24 may signal a redirect for such indirect branch ops. The taken/not taken prediction may be verified by the execution core 24 and misprediction may be signaled if the predicted direction is incorrect. The scheduler 20 may be configured to record the misprediction associated with the corresponding branch op, and may signal redirection to the fetch control unit 12. The redirection may be delayed until previous ops are known to not cause a redirection themselves. For example many instructions such as arithmetic/logic ops do not cause redirections, and thus once any previous ops which can cause redirection are executed, the redirection for the mispredicted branch op may be reported to the fetch control unit 12. In other embodiments, the redirection may be reported immediately or may be signaled directly by the execution core 24 to the fetch control unit 12.

Accordingly, a given indirect branch may not be correctly predicted the first time it is executed (since the indirect branch target predictor 28 has not learned its target address yet). The mismatch with the validation tags in the indirect predictor 28 may prevent the processing of subsequent speculative instructions. The scheduler 20 may signal a redirect with the target address, and the indirect branch target predictor 28 may capture the redirect_PC (in addition the fetch control unit 12 transmitting the redirect_PC as the fetch PC to the instruction cache 14). The scheduler 20 may also provide the corresponding validation tag data, which may be captured by the indirect branch target predictor 28 (or the validation tag data may be stored locally in the fetch control unit 12 for each indirect branch fetched by the processor 10). During subsequent execution of the same indirect branch, the indirect branch target predictor 28 may predict the previously-generated target address. If the target address is static from execution to execution of the indirect branch target, the target address may be successfully predicted.

The scheduler 20, the mapper 18 and the decode unit 16 may all flush any ops/instructions from the speculative instruction streams that are subsequent to the mispredicted branch in program order (if any). The scheduler 20/mapper 18 may also regenerate any speculative state corresponding to the non-flushed ops, if any. In the case that an indirect branch was not predicted, no flushing/speculative state regeneration may be needed.

The register file 22 may generally comprise any set of registers usable to store operands and results of ops executed in the processor 10. In some embodiments, the register file 22 may comprise a set of physical registers and the mapper 18 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may comprise an architected register set containing the committed state of the logical registers and a speculative register set containing speculative register state.

The interface unit 24 may generally include the circuitry for interfacing the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. In various embodiments, the processor 10 may implement any instruction set architecture.

Figure 2:
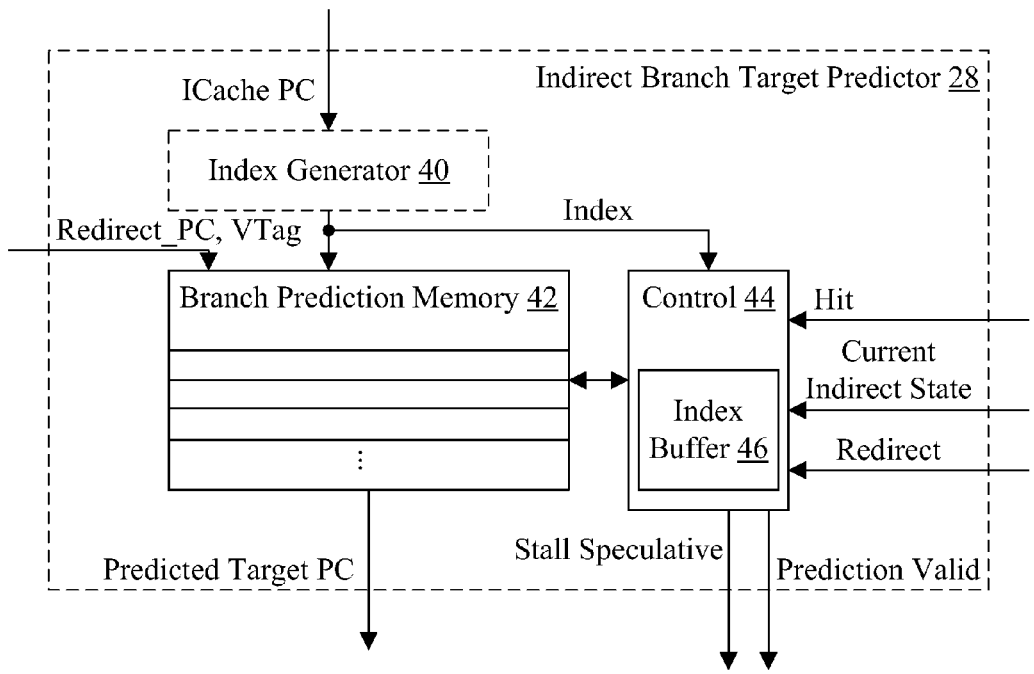
FIG. 2 is a block diagram of one embodiment of an indirect branch target predictor shown in FIG. 1.

Turning now to FIG. 2, a block diagram of one embodiment of the indirect branch target predictor 28 is shown. In the illustrated embodiment, the indirect branch target predictor 28 includes an index generator 40, a branch prediction memory 42, and a control circuit 44 that includes an index buffer 46 in this embodiment. The index generator 40 is coupled to receive the ICache PC and is configured to provide an input index to the branch prediction memory 42 and the control circuit 44. The control circuit 44 is coupled to the branch prediction memory 42 and to receive the hit indication from the instruction cache 12, a current indirect state corresponding to a current indirect branch instruction to be predicted, and the redirect controls from the scheduler 20. The control circuit 44 is configured to provide a prediction valid indication and a stall speculative indication, and the branch prediction memory 42 is configured to provide a predicted target PC. The branch prediction memory 42 is coupled to receive the redirect_PC and related validation tag (VTag) data.

The index generator 40 is coupled to receive the ICache PC and to generate an index to the branch prediction memory 42 to read one or more branch prediction entries. The index generator 40 may select certain PC bits from the ICache PC, and may logically combine or hash those bits with other data to generate the index. For example, the index may be generated by hashing the PC bits with a global taken/not taken branch history, or with data output from one of the other predictors 30. The index generator 40 is optional, and the index may simply be the selected PC bits in other embodiments. Generally, an index may be any combination of bits that is input to a memory to select an entry or entries in that memory for reading or writing.

The branch prediction memory 42 includes multiple branch prediction entries. Each entry may store information corresponding to an indirect branch, including a target address generated during a previous execution of the indirect branch, as well as the validation tag data. The branch prediction memory 42 may have any arrangement (e.g. set associative, direct mapped, fully associative, etc.). The branch prediction memory may have any construction (e.g. random access memory (RAM), content addressable memory (CAM), registers, etc.). A CAM embodiment may CAM on the validation tag and may store the target address in a corresponding RAM. Combinations of various memory types may be used as desired.

The control circuit 44 may be configured to enable a read of the branch prediction memory 42 in response to the hit indication indicating a cache hit in the instruction cache 14 for the ICache PC. The control circuit 44 may receive the validation tag (or tags, if multiple entries are read in response to an index), and may be configured to compare the validation tag to the corresponding current indirect state (corresponding to the indirect branch being predicted). If the control circuit 44 detects a match between the validation state and the validation tag, the control circuit 44 may assert the prediction valid indication indicating that the predicted target PC output by the branch prediction memory 42 is valid and may be used as a fetch PC. If multiple entries are read in response to an index, the control circuit 44 may detect which entry stores matching validation tag data, and may cause the branch prediction memory 44 to output the predicted target PC from that entry.

On the other hand, the control circuit 44 may detect that the validation tag in the entry (or entries) does not match the current indirect state. The control circuit 44 may assert the stall speculative indication to stall speculative processing of instructions following the indirect branch in the speculative instruction stream. For example, the instructions at the target address output by the branch prediction memory 42 may not be fetched, or may be fetched and stalled, or decoded and stalled, or even remapped and stalled in the scheduler 20. In some cases, the indirect branch target predictor 28 may not have a valid branch prediction entry corresponding to an index. In such cases, there is no predicted target address to fetch from.

In one embodiment, the control circuit 44 may continue asserting the stall speculative indication until a redirect is received from the scheduler. In other embodiments, circuitry elsewhere in the processor 10 may continue inhibiting the speculative processing of instructions after the indirect branch in the speculative instruction stream.

As mentioned above, in some embodiments, the indirect branch target predictor 28 may only be accessed for predicted-taken indirect branch instructions. Thus, if a predicted not taken indirect branch is fetched, fetching may continue with the sequential instructions.

In one embodiment, the control circuit 44 may be configured to store the indexes to the branch prediction memory 42 for outstanding predicted indirect branches in the index buffer 46. The data in the index buffer 46 may also include data from the entry, such as the validation tag. The redirect from the scheduler 20 may include an address of the index buffer entry corresponding to the index, and the control circuit 44 may read the index and provide it to the branch prediction memory 42 to write the redirect_PC and corresponding validation tag data into the branch prediction memory 42. Alternatively, the index or even the complete PC of the indirect branch that is mispredicted may be supplied by the scheduler 20. The redirect information provided by the scheduler 20 may also identify the redirect as being detect for an indirect branch (or detected for other branch types). The control circuit 44 may update the branch prediction memory 42 in response to a redirect for an indirect branch, but not otherwise.

In some embodiments, the control circuit 44 may be configured to monitor entries to detect whether or not thrashing is occurring in one or more entries. Thrashing may occur when entries are continuously overwritten by data corresponding to different indirect branch instructions. In such cases, an entry will frequently have the wrong data for a given indirect branch instruction that indexes to that entry. The control circuit 44 may write entries with an indication that thrashing is occurring, and the indication may be used as part of the validation tag to prevent speculative processing of the target instructions.

Figure 3:
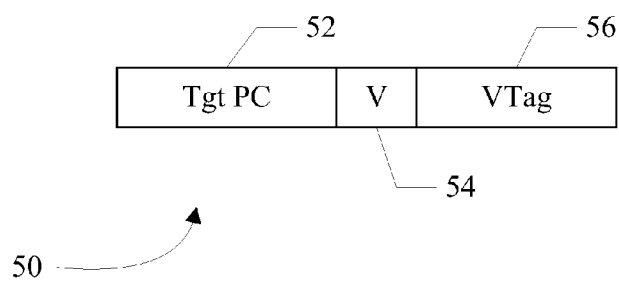
FIG. 3 is a block diagram of one embodiment of an entry from a branch predictor memory shown in FIG. 2.

Turning now to FIG. 3, a block diagram of one embodiment of a branch prediction entry 50 for the branch prediction memory 42 is shown. In the illustrated embodiment, the entry 50 may include a target PC field 52, a valid bit 54, and a validation tag (VTag) field 56. Other fields of data may be provided as desired. The target PC field 52 may store the target PC of an indirect branch being tracked by the entry. The target PC field 52 may be written with the redirect_PC when a redirect for an indirect branch is detected. The valid bit 54 may indicate whether or not the entry is valid. For example, the valid bit may indicate valid when set, and invalid when clear (or vice versa). The validation tag field 56 may store the validation tag corresponding to the indirect branch instruction.

Figure 4:
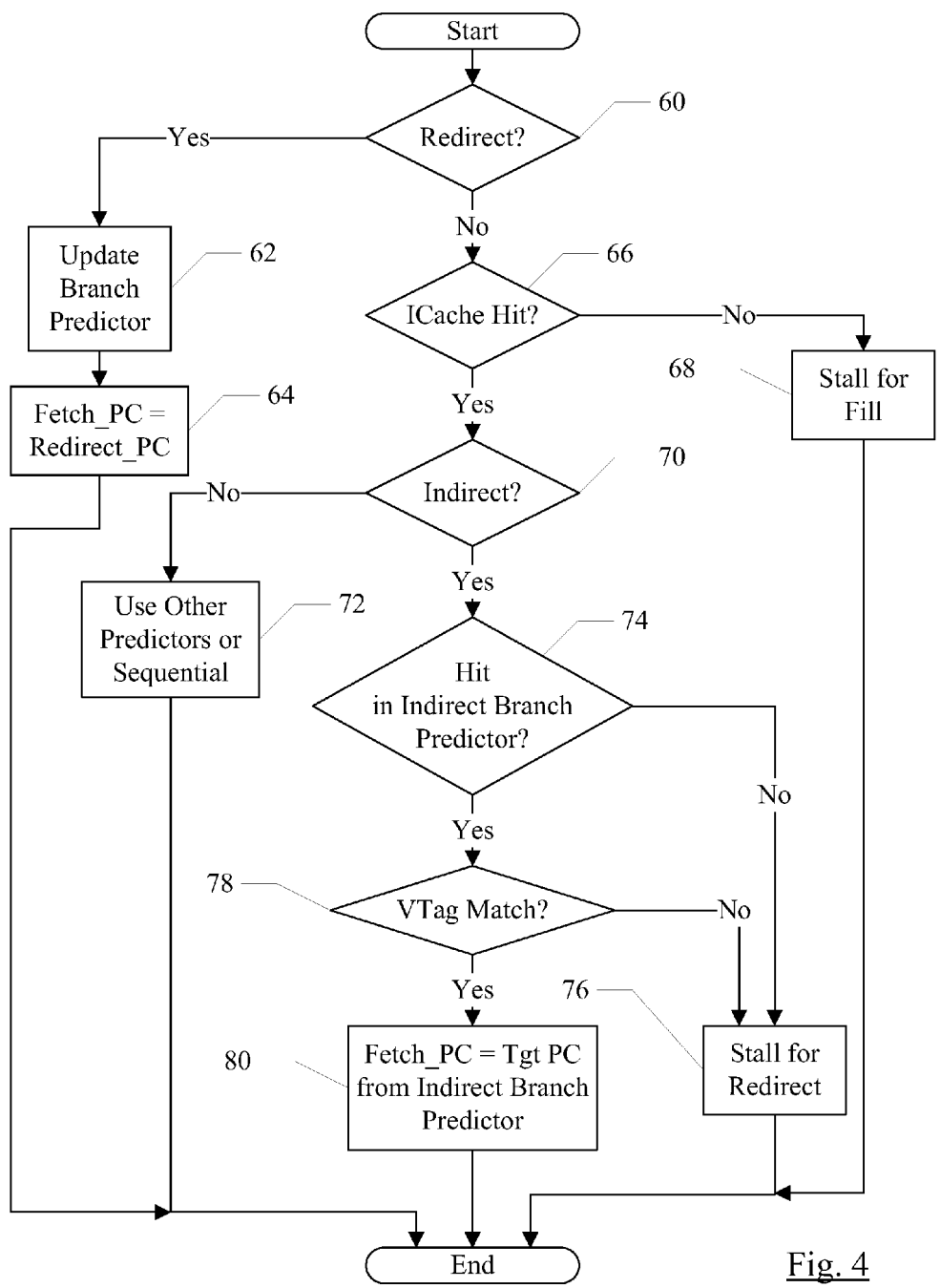
FIG. 4 is a flowchart illustration operation of one embodiment of a fetch control unit shown in FIG. 1.

Turning now to FIG. 4, a flowchart illustrating operation of one embodiment of the fetch control unit 12, including the indirect branch predictor 28 (and more particularly the control circuit 44, in an embodiment) to make a prediction and to update in response to a redirect is shown. While the blocks are shown in a particular order for ease of understanding, other orders may be used. Blocks may be performed in parallel in combinatorial logic within the indirect branch predictor 28/control circuit 44. Blocks, combinations of blocks, and/or the flowchart as a whole may be pipelined over multiple clock cycles. The indirect branch predictor 28 may be configured to implement the operation shown in FIG. 4.

If the scheduler 20 signals a redirect for an indirect branch instruction (decision block 60, "yes" leg), the control circuit 44 may update the branch prediction memory 42 with the redirect_PC and validation tag data (block 62). The redirect_PC is the target address of the indirect branch, generated during execution of the indirect branch instruction. Accordingly, branch prediction memory entries store target addresses of previously executed indirect branches. The control circuit 44 may set the valid bit in the entry as well. In embodiments that select multiple entries per index, the control circuit 44 may select an entry to update if the mispredicted indirect branch instruction did not have a matching entry when fetched. The fetch control unit 12 (and more particularly the control circuit 26) may select the redirect PC as the fetch PC (block 64).

If an instruction cache miss is detected for a fetch (decision block 66, "no" leg), the fetch control unit 12/control circuit 26 may stall fetching to await the fill data for the instruction cache miss (block 68). If an instruction cache hit is detected for a fetch (decision block 66, "yes" leg), and an indirect branch is not fetched or predicted to be fetched (decision block 70, "no" leg), the results of the other predictors 30 may control the next fetch address and/or the sequential address may be fetched (block 72).

On the other hand, an instruction cache hit (decision block 66, "yes" leg) and a fetching of an indirect branch (decision block 70, "yes" leg) may involve the indirect branch predictor 28. If there is a miss in the indirect branch predictor 28 (decision block 74, "no" leg), for example because the valid bit in the select entry or entries is clear, the control circuit 44 may deassert the prediction valid signal and may assert the stall speculative signal to stall speculative processing for the redirect corresponding to the indirect branch (block 76). Similarly, if there is a hit in the indirect branch predictor 28 (decision block 74, "yes" leg) but the validation tag does not match for the current indirect branch (decision block 78, "no" leg), the control circuit 44 may deassert the prediction valid signal and may assert the stall speculative signal to stall speculative processing for the redirect corresponding to the indirect branch (block 76). If there is a hit in the indirect branch predictor 28 (decision block 74, "yes" leg) and the validation tag does match for the current indirect branch (decision block 78, "yes" leg), the target PC output by the branch prediction memory 52 may be used by the fetch control unit 12/control circuit 26 as the next fetch PC. That is, the prediction valid may be asserted by the control circuit 44 and the stall speculative signal may be deasserted (block 80).

System and Computer Accessible Storage Medium

Figure 5:
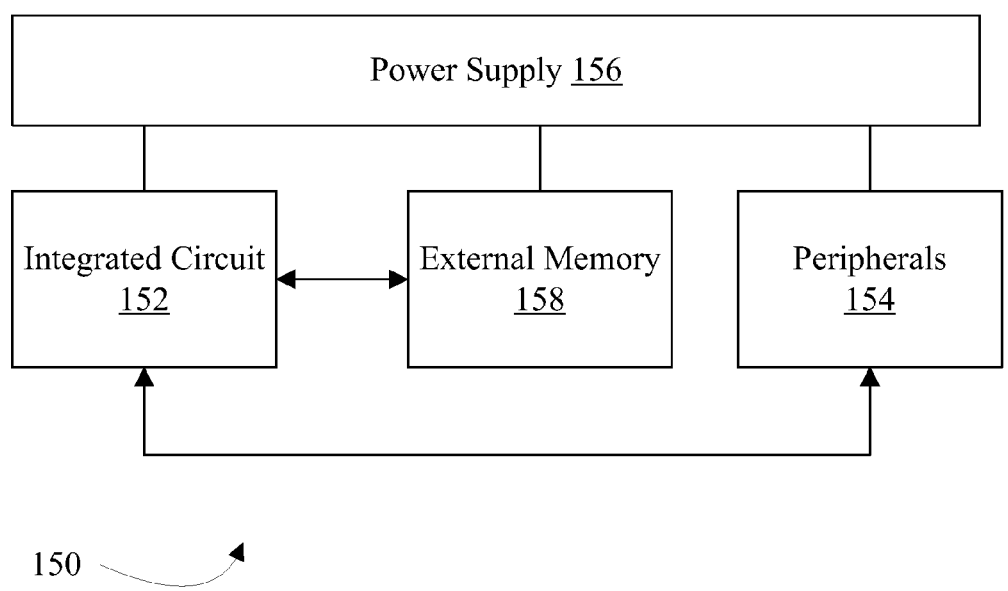
FIG. 5 is a block diagram of one embodiment of a system including an integrated circuit that may include one or more processors shown in FIG. 1.

Turning next to FIG. 5, a block diagram of one embodiment of a system 150 is shown. In the illustrated embodiment, the system 150 includes at least one instance of an integrated circuit 152. The integrated circuit 152 may include one or more instances of the processor 10 (from FIG. 1). The integrated 152 may, in one embodiment, be a system on a chip including one or more instances of the processor 10 and various other circuitry such as a memory controller, video and/or audio processing circuitry, on-chip peripherals and/or peripheral interfaces to couple to off-chip peripherals, etc. The integrated circuit 152 is coupled to one or more peripherals 154 and an external memory 158. A power supply 156 is also provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMM5), etc.

Numerous variations and modifications will become apparent to those skilled in the art once the above disclosure is fully appreciated. It is intended that the following claims be interpreted to embrace all such variations and modifications.

What is claimed is:

1. An indirect branch predictor comprising:
a branch prediction memory comprising a plurality of entries, wherein each entry is configured to store a target address corresponding to a previously-executed indirect branch instruction and a corresponding validation tag corresponding to the previously-executed indirect branch instruction, wherein the validation tag is derived at least in part from at least a portion of a program counter address (PC) of the previously-executed branch instruction, wherein the branch prediction memory is coupled to receive an index selecting at least a first entry of the plurality of entries, wherein the branch prediction memory is configured to output a first target address and a first validation tag from the first entry in response to the index; and
a control circuit coupled to the branch prediction memory and coupled to receive the first validation tag, wherein the control circuit is configured to compare the first validation tag to corresponding state for a current indirect branch instruction, and wherein the control circuit is configured to inhibit speculative processing of instructions at the first target address responsive to the first validation tag not matching the corresponding states for the current indirect branch instruction because the first target address corresponds to a different indirect branch instruction, and wherein the control circuit is further configured to inhibit speculative processing of instructions at a sequential address to the current indirect branch instruction responsive to the first validation tag not matching the corresponding states for the current indirect branch instruction.

2. The indirect branch predictor as recited in claim 1 wherein the control circuit is configured to inhibit speculative processing of instructions by inhibiting instruction fetch until the current indirect branch instruction is executed and provides a target address to fetch.

3. The indirect branch predictor as recited in claim 1 wherein the control circuit is configured to inhibit speculative processing of instructions by permitting instruction fetch from the first target address but stalling the fetched instructions prior to decode.

4. The indirect branch predictor as recited in claim 1 wherein the first validation tag comprises one or more bits of the PC not used to generate the index.

5. The indirect branch predictor as recited in claim 1 wherein the first validation tag comprises a portion of the previously-executed indirect branch instruction that corresponds to the branch target address.

6. The indirect branch predictor as recited in claim 5 wherein the portion of the previously-executed indirect branch instruction comprises one or more register addresses of one or more register operands used to generate the first target address.

7. A processor comprising:
an instruction cache configured to store a plurality of instructions including indirect branch instructions; and
a fetch control unit coupled to the instruction cache and configured to generate fetch addresses to fetch instructions from the instruction cache, wherein the fetch control unit comprises an indirect branch target predictor configured to predict target addresses for indirect branch instructions, and wherein the fetch control unit is configured to use the predicted target address if an indirect branch instruction is in a speculative instruction stream, and wherein the indirect branch instruction comprises one or more register operands used by the processor during execution to calculate the target address, and wherein the indirect branch target predictor is configured to store a plurality of indirect branch target addresses and a corresponding plurality of validation values generated from state corresponding to previously-executed indirect branch instructions that generated the plurality of indirect branch target addresses during execution, and wherein the state comprises one or more register addresses of the one or more register operands, and wherein the indirect branch predictor is coupled to receive corresponding data for the indirect branch instruction in the speculative instruction stream, and wherein the indirect branch predictor is configured not to predict a first target address selected from the plurality of indirect branch target addresses for the indirect branch instruction responsive to the corresponding data not matching a first validation value associated with the first target address.

8. The processor as recited in claim 7 wherein the fetch control unit includes at least one additional branch predictor, and wherein the fetch control unit is configured to predict the indirect branch instruction taken or not taken using the at least one additional branch predictor.

9. The processor as recited in claim 8 wherein the fetch control unit is configured to access the indirect branch target predictor for the indirect branch instruction only responsive to the additional branch predictor predicting the indirect branch instruction taken.

10. The processor as recited in claim 7 further comprising an execution core configured to execute an indirect branch operation corresponding to the indirect branch instruction and configured to detect a misprediction of the indirect branch instruction, wherein the fetch unit is coupled to receive a redirect address from which to fetch in response to the misprediction, and wherein the fetch unit is configured to update the indirect branch target predictor with the redirect address responsive to the misprediction being detected for an executed indirect branch target operation.

11. The processor as recited in claim 10 wherein the fetch unit is configured to update the indirect branch target predictor only if the misprediction is due to a taken indirect branch instruction for which the target address is mispredicted or not predicted.

12. The processor as recited in claim 10 further comprising a scheduler configured to schedule operations for execution, wherein the scheduler is coupled to receive an indication of the misprediction from the execution core and configured to provide the redirect address to the fetch control unit.

13. The processor as recited in claim 7 wherein the fetch control unit is configured to access the indirect branch predictor for the indirect branch instruction responsive to the instruction cache detecting a hit in the instruction cache for a fetch address corresponding to the indirect branch instruction.

14. A method comprising:
receiving data corresponding to an indirect branch instruction in an indirect branch target predictor;
the indirect branch target predictor selecting a branch predictor entry in the indirect branch target predictor, wherein the branch predictor entry stores a target address and a validation tag;
the indirect branch target predictor comparing the validation tag to the data;
inhibiting a prediction of the target address for the indirect branch instruction responsive to the validation tag not matching the data; and
inhibiting processing of instructions at a sequential address to the indirect branch instruction responsive to the validation tag not matching the data.

15. The method as recited in claim 14 further comprising:
receiving second data corresponding to a second indirect branch instruction in the indirect branch target predictor;
the indirect branch target predictor selecting a second branch predictor entry in the indirect branch target predictor, wherein the second branch predictor entry stores a second target address and a second validation tag;
the indirect branch target predictor comparing the second validation tag to the second data; and
predicting the second target address for the second indirect branch instruction responsive to the second validation tag matching the data.

16. The method as recited in claim 15 further comprising fetching instructions from the second target address responsive to the predicting.

17. The method as recited in claim 14 further comprising stalling instruction fetching until the indirect branch instruction is executed in response to inhibiting the prediction.

18. The method as recited in claim 17 further comprising:
executing the indirect branch instruction;
receiving a redirect address responsive to the execution;
updating the branch predictor entry with the redirect address and the data.

19. An indirect branch predictor comprising:
a branch prediction memory coupled to receive an index derived from a fetch address used to fetch an indirect branch instruction, wherein the branch prediction memory is configured to output at least a first predicted target address and at least a first validation tag in response to the index, wherein the first validation tag corresponds to the first predicted target address and comprises at least one attribute of the indirect branch instruction other than the fetch address of the indirect branch instruction; and a control circuit coupled to the branch prediction memory and coupled to receive data corresponding to the indirect branch instruction, wherein the control circuit is configured to control whether or not the first predicted target address is to be used for the indirect branch instruction responsive to matching the data and the first validation tag, and wherein the control circuit is configured to inhibit processing of instructions at both the first predicted target address and a sequential address to the indirect branch instruction responsive to determining that the first predicted target address is not to be used for the indirect branch instruction.

20. The branch predictor as recited in claim 19 wherein the control circuit is configured to inhibit using the first predicted target address for an indirect branch instruction responsive to the data not matching the validation tag.

21. The branch predictor as recited in claim 19 wherein the at least one attribute comprises a portion of the indirect branch instruction.

22. The branch predictor as recited in claim 19 wherein the first validation tag further comprises one or more bits of the fetch address.

* * * * *